(12) United States Patent
Xu et al.

(10) Patent No.: US 7,483,553 B2
(45) Date of Patent: Jan. 27, 2009

(54) CARICATURE EXAGGERATION

(75) Inventors: Ying-Qing Xu, Beijing (CN);
Heung-Yeung Shum, Bellevue, WA (US); Michael Cohen, Seattle, WA (US); Lin Liang, Beijing (CN); Hua Zhong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 643 days.

(21) Appl. No.: 10/812,754

(22) Filed: Mar. 29, 2004

(65) Prior Publication Data

US 2005/0212821 A1 Sep. 29, 2005

(51) Int. Cl.
*G06K 9/00* (2006.01)
(52) U.S. Cl. .................. 382/118; 382/276; 345/473
(58) Field of Classification Search .............. 382/118, 382/128
See application file for complete search history.

(56) References Cited

U.S. PATENT DOCUMENTS 4,975,969 A * 12/1990 Tal .............................. 382/116
6,385,628 B1 * 5/2002 Massarsky .................. 715/502
7,095,878 B1 * 8/2006 Taylor et al. ................. 382/118
7,149,961 B2 * 12/2006 Harville et al. ........... 715/501.1

OTHER PUBLICATIONS

Lin Liang, Hong Chen, Ying-Qing Xu, Heung-Yeung Shum, "Example-based Caricature Generation with Exaggeration", Oct. 2002, IEEE, pp. 386-393.*
Tommi S. Jaakkola, David Haussler, "Probabilistic kernel regression models", 1999, Conference on AI and Statistics, total pages: 9.*

* cited by examiner

*Primary Examiner*—Yosef Kassa
*Assistant Examiner*—Edward Park
(74) *Attorney, Agent, or Firm*—Lee & Hayes, PLLC

(57) ABSTRACT

Caricature exaggeration systems, engines, and methods create a drawing of a facial image, compare relationships among facial features in the drawing to corresponding relationships in facial images and corresponding caricatures in a database, and automatically exaggerate at least one relationship among facial features in the drawing based on the facial images and the corresponding caricatures in the database.

39 Claims, 12 Drawing Sheets

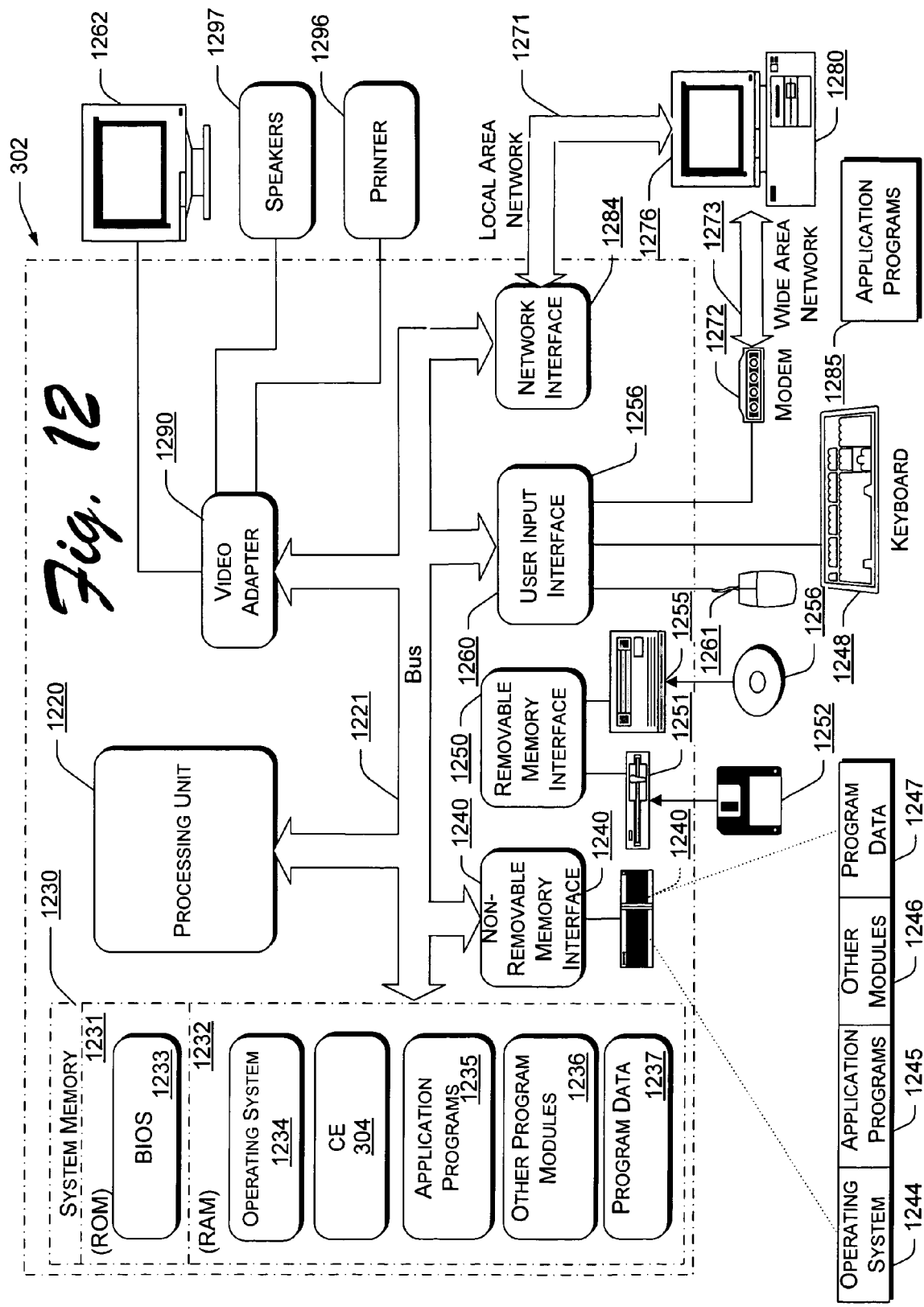

CARICATURE EXAGGERATION

TECHNICAL FIELD

Subject matter relates generally to computerized image generation and more specifically to caricature exaggeration.

BACKGROUND

An artist's caricature of a face catches one's attention because the artistically exaggerated features impart a comic, grotesque, literary, political, or editorial quality. A worthy caricature emphasizes facial features that make the caricatured person different from everyone else. Hence, the caricatured person is still recognizable yet the exaggerated features make the caricature interesting for viewers.

"Exaggeration" as used herein, means a change in an aspect of a facial image. A usual connotation of the term often implies an increase or an enlargement in something. With regard to the art of caricature, however, an exaggeration can also be a decrease or a diminution of some facial aspect or dimension. In fact, as used herein, exaggeration often means a furthering of some noticeable facial aspect (that distinguishes a person from other people) in the same direction that makes the facial aspect stand out in the first place. So if a person's eyes seem too close together, a good caricature exaggerates this feature by moving the eyes even closer together—but the distance between the eyes decreases: hardly an exaggeration in the conventional sense of the word.

Recently, a number of non-photorealistic rendering algorithms have been proposed to allow computers to draw sketches, engravings, oil paintings, and variously styled line drawings. For example, algorithms for sketches are presented in: H. Chen, Y. Q. Xu, H. Y. Shum, S. C. Zhu, and N. N. Zheng, "Example-based facial sketch generation with non-parametric sampling," *ICCV* 2001, 2001. Algorithms for engravings are presented in: V. Ostromoukhov, "Digital facial engraving," *Proceedings of SIGGRAPH* 1999, 1999. Algorithms for oil paintings are presented in: A. Hertzmann, C. E. Jacobs, N. Oliver, B. Curless, and D. H. Salesin, "Image analogies," *Proceedings of SIGGRAPH* 2001, *Computer Graphics Proceedings, Annual Conference Series,* 2001. Algorithms for variously styled line-drawings are presented in: W. T. Freeman, J. B. Tenenbaum, and E. Pasztor, "An example-based approach to style translation for line drawings," *Technical Report TR*99-11, 1999; and H. Koshimizu et al., "On kansei facial processing for computerized facial caricaturing system picasso," *IEEE International Conference on Systems, Man, and Cybernetics,* vol. 6, 1999, (the "Koshimizu reference"). These conventional systems focus on the painting style or stroke style of the image but not on the exaggeration of faces.

Some tools have been introduced to aid users in creating caricatures (e.g., B. Gooch, E. Reinhard, and A. Gooch, "Perception-driven black-and-white drawings and caricatures," *Technical Report UUCS-*02-002, 2002; and E. Akleman, J. Palmer, and R. Logan, "Making extreme caricatures with a new interactive 2D deformation technique with simplicial complexes," *Proceedings of Visual* 2001, 2000) but these tools do not instruct users how to perform exaggeration. While experienced caricaturists may be able to generate interesting caricatures with the above-cited tools, inexperienced users may have difficulty determining how to exaggerate a face.

Some conventional systems try to automatically generate caricatures using a computer. The most common way to attempt exaggeration using a computer employs finding differences in facial features (eye, nose, mouth, chin, etc.) between a face to be caricatured and an average face and then enlarging these facial features. This approach has been employed in the work of S. E. Brennan, "Caricature generator: The dynamic exaggeration of faces by computer," *Leonardo,* 18(3): 170-178, 1985; in the work of T. Valentine, "A unified account of the effects of distinctiveness, inversion and race in face recognition," *The Quarterly Journal of Experimental Psychology,* 43(2): 161-204, 1991; and in the Koshimizu reference, cited above. These conventional systems can provide users with some information about how to perform exaggeration and can allow for adjustment of the exaggeration. But as shown in FIG. 1, these conventional systems are limited to exaggerating only individual features of a face, such as the eyes 102, 102', 102" or the mouth 104, 104', 104." In response to a user adjusting the degree of exaggeration, these conventional systems have no mechanism for maintaining facial integrity. For example, sometimes if the distance between two eyes has been enlarged too far, the eyes may extend beyond the outside contour of the face.

A set of pre-designed exaggeration templates is used to generate caricatures in the work of H. Chen, N. N. Zheng, L. Liang, Y. Li, Y. Q. Xu, and H. Y. Shum, "Pictoon: A personalized image-based cartoon system," *ACM Multimedia* 2002, 2002. The templates allow facial integrity to be maintained but users have to choose the template to be used for performing exaggeration and the degree of exaggeration is fixed.

In one reference, a caricature training database is used and some exaggeration prototypes are learned from the database using principle component analysis ("PCA") in the work of L. Liang, H. Chen, Y. Q. Xu, and H. Y. Shum, "Example-based caricature generation with exaggeration," *IEEE Pacific Graphics* 2002, 2002. When a new facial image is presented to this conventional system, a particular prototype is chosen automatically and the magnitude of the exaggeration is discovered through linear regression. This system informs a user how to perform exaggeration and determines the magnitude of exaggeration automatically, but users cannot adjust the magnitude of exaggeration applied. Additionally, this conventional system has no mechanism to maintain facial integrity and suffers the additional limitation that its training database is partitioned according to learned exaggeration prototypes, so if there are only a few training samples for each prototype then instability is likely.

SUMMARY

The subject matter includes methods, systems, and engines for automatically producing facial caricatures. The automated caricature production incorporates at least two principles of relativity used by professional human caricaturists. In one implementation, an exemplary system compares relationships among facial features in a candidate drawing to be caricatured to corresponding relationships in facial images and corresponding caricatures in a database. The exemplary system then automatically exaggerates at least one relationship among facial features in the drawing. A user may also vary the amount of exaggeration to be applied to a drawing or to an individual feature or relationship in the drawing. An exemplary system may include a constraint engine that compares proposed exaggerations to the caricatures in the database in order to constrain the exaggeration, if necessary, within the realm of artful and realistic facial caricatures.

BRIEF DESCRIPTION OF THE DRAWINGS

FIG. 12 is a block diagram of an exemplary computing device environment for practicing the subject matter.

DETAILED DESCRIPTION

Overview

The subject matter includes methods, systems, and devices for automatically producing facial caricatures: those drawings of a face that artistically exaggerate a person's face to impart an interesting comic, grotesque, literary, political, or editorial quality. Caricature can also be defined as an exaggerated likeness of a person made by emphasizing all of the features that make the person different from everyone else. The subject matter incorporates at least two principles of relativity used by professional human caricaturists into automated systems. An experienced human caricaturist is trained to spot the most distinguishing features of a particular person and exaggerate them in such a way that the caricature will look much more interesting than an original photo. Drawing caricatures is a highly artistic job, but it is an art form approachable to a degree with exemplary techniques described herein. Caricaturists often believe that a critical ingredient in producing an exciting caricature is the relativity ("relationships") between and among facial features.

Figure 1:
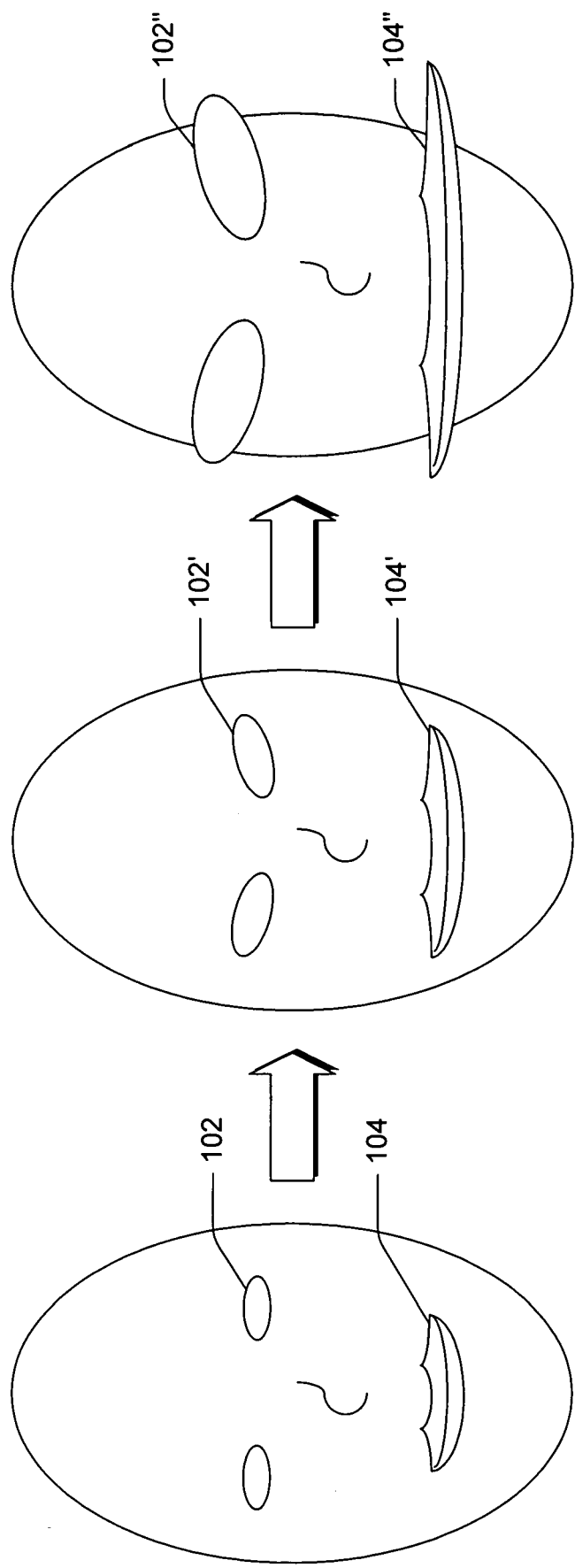
FIG. 1 is a graphic representation of conventional facial feature exaggeration techniques.
Figure 2:
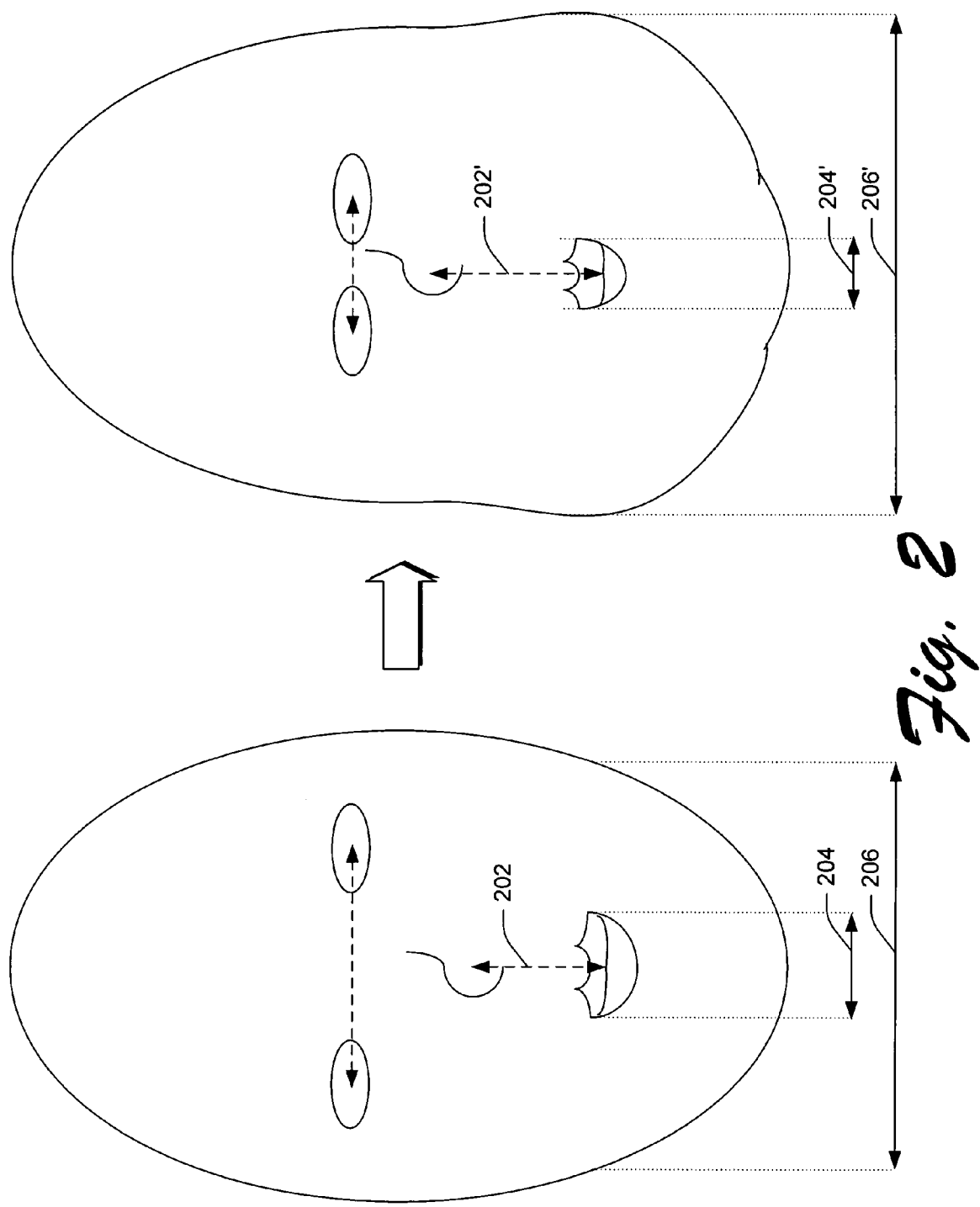
FIG. 2 is a graphic representation of an exemplary method of performing caricature exaggeration using exaggeration of facial features and exaggeration of relationships between and among facial features.

The subject matter uses not only a conventional first principle of relativity wherein facial features, such as the size of the eyes, the shape of the nose, etc., are exaggerated with respect to themselves (as depicted in FIG. 1) or with respect to a norm, but also a second principle of relativity wherein relationships between or among facial features can also be exaggerated. It should be noted that on a basic level, a "feature" denotes a horizontal and/or vertical distance between two key points. The second principle of relatively applies between features. For example, as shown in FIG. 2, a distinctive vertical distance between a person's nose and mouth (202) is a relationship between and/or among facial features that can be exaggerated (202') by the subject matter, or, a distinctive relative proportion (204 in relation to 206) between the width of a person's mouth 204 and the width of that person's cheeks 206 at the mouth level is another relationship between facial features that can be exaggerated (204' in relation to 206') by the subject matter. This second principle of relativity adds a great deal of visual impact to caricatures. Incorporation of the second principle of relativity allows additional types of caricature to be applied, better control of automatic exaggeration of features, and the application of various additional mathematical treatments that cannot be used with conventional computerized techniques.

The subject matter includes an exemplary system that automatically generates caricatures from an input facial image, such as a photo. In one implementation, an exemplary system can apply an iterative kernel regression (KR) technique to a database of training images to automatically determine which facial features and relationships between facial features to exaggerate, and how much exaggeration to apply, allowing inexperienced users to generate interesting and artistically respectable caricatures. After exaggerating some facial features and relationships, a maximum likelihood estimation (MLE) technique is also employed as a model and/or constraint to generate an exaggerated facial image, which is used to morph the unexaggerated drawing into a caricature for output, while maintaining recognizably human facial integrity. The KR technique automatically determines what to exaggerate, how to exaggerate it, and the degree of exaggeration to apply while global facial image constraints are maintained during the exaggeration process by the MLE algorithm.

Exemplary System

Figure 3:
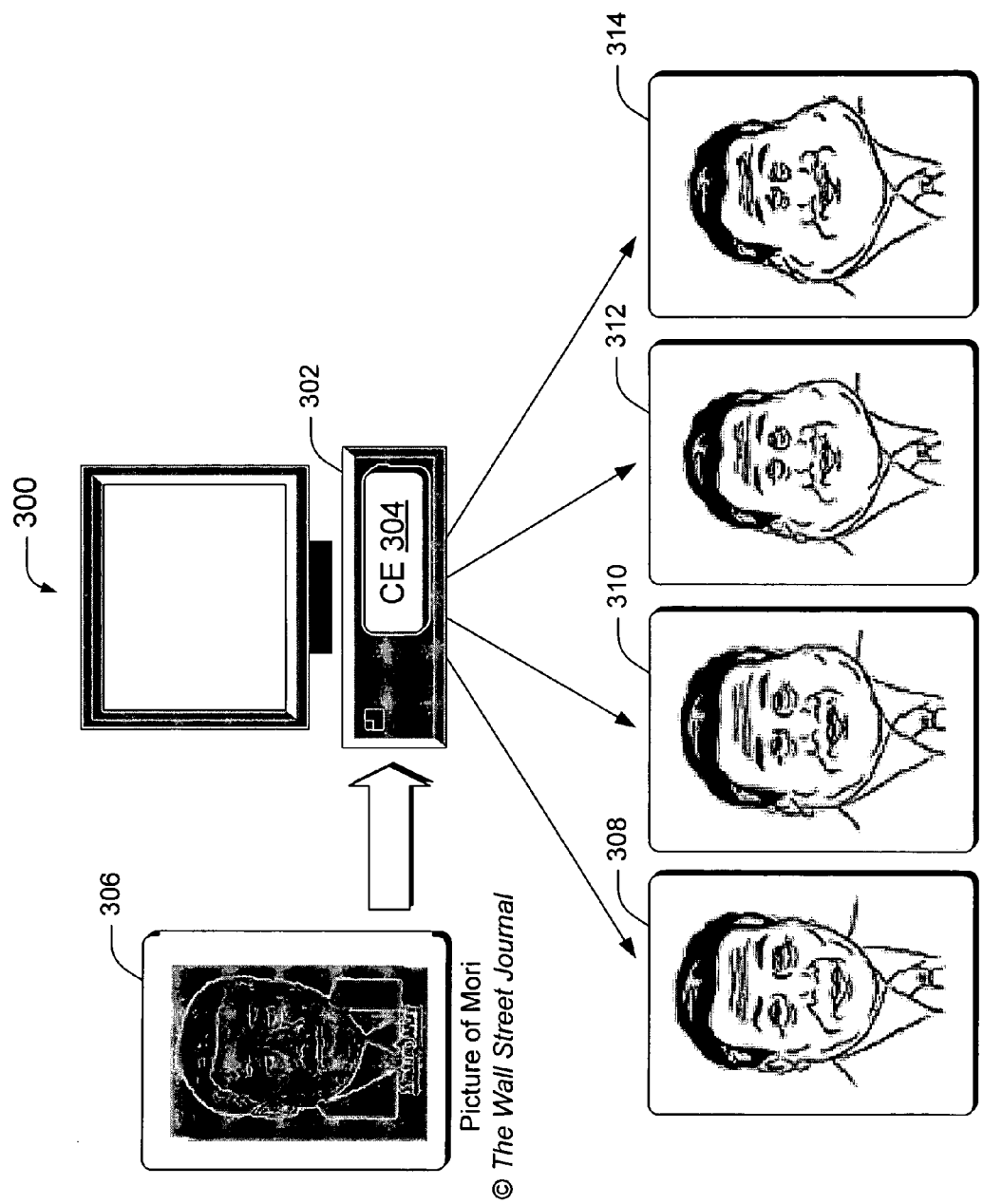
FIG. 3 is a graphic representation of an exemplary caricature exaggeration system.

FIG. 3 shows an exemplary caricature system 300 in which a computing device 302 includes an exemplary caricature engine ("CE") 304. The exemplary CE 304 receives a facial image 306, creates an unexaggerated drawing 308 of the received facial image 306, and allows a user to select different degrees of exaggeration (e.g., 310, 312, 314) for caricatures generated by the exemplary CE 304. Extreme and wild caricatures can be created while the exemplary CE 304 (or another system practicing one of the exemplary methods described herein) automatically constrains aspects of the selected exaggeration if needed to maintain facial integrity—that is, nonsensical facial images are automatically prevented.

An exemplary caricature system 300 allows a user almost unlimited control over aspects of exaggeration and over the magnitude of exaggeration applied to various facial features and relationships between and/or among facial features.

An exemplary computing device 302 suitable for practicing the subject matter is described with respect to FIG. 12.

Exemplary Engines

Figure 4:
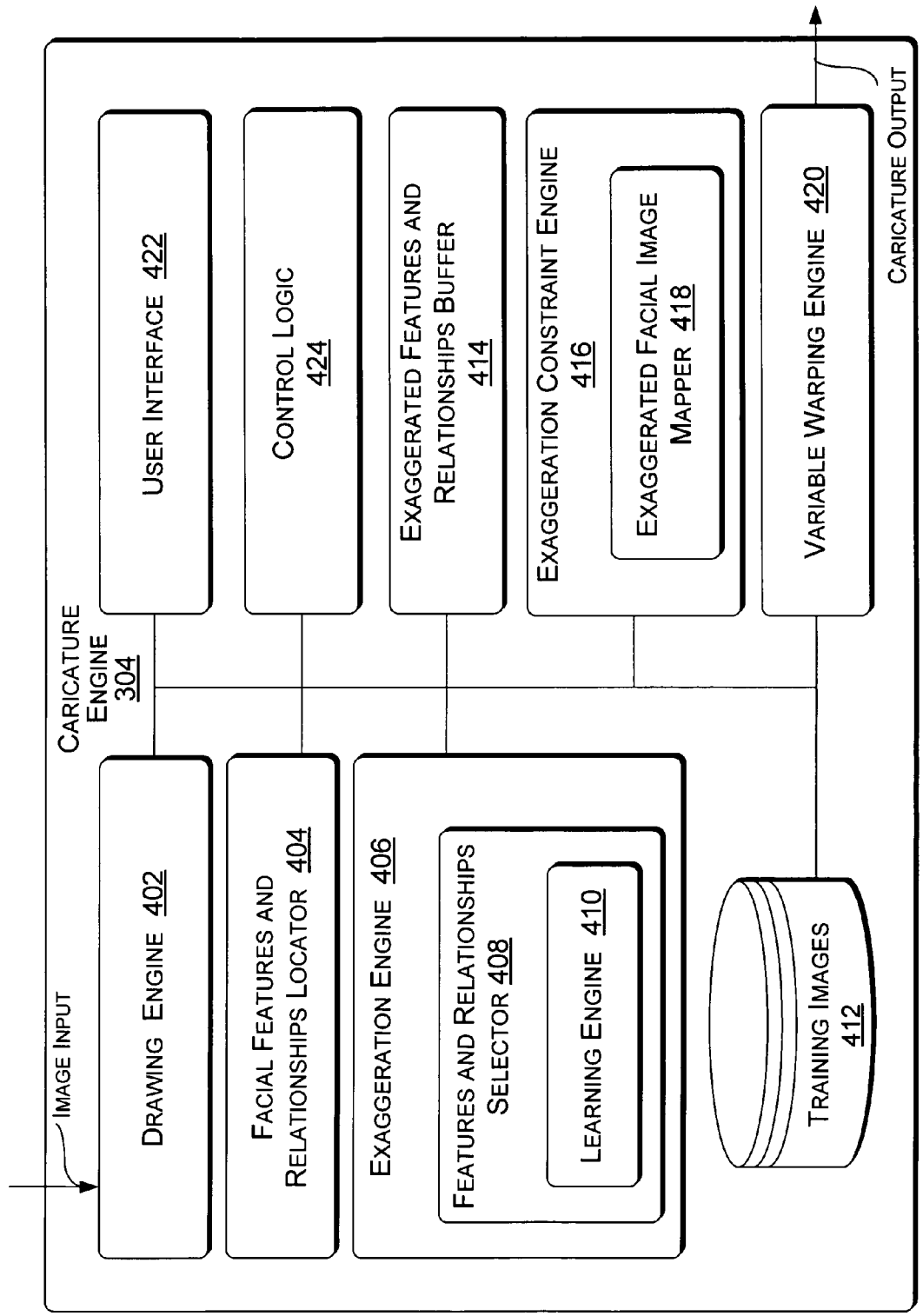
FIG. 4 is a block diagram of an exemplary caricature engine.

FIG. 4 shows an exemplary CE 304 in greater detail than in FIG. 3. In one implementation an exemplary CE 304 includes a drawing engine 402 to produce, derive, and/or input a candidate drawing for caricature; a facial features and relationships locator 404 to map or mathematically model features and relationships of the candidate drawing; an exaggeration engine 406 to receive the map or model and automatically exaggerate at least some of the facial features and/or relationships; a features and relationships selector 408 to learn which features and relationships are to be exaggerated and how much exaggeration to apply; a learning engine 410 in the features and relationships selector 408 to apply learning techniques; a database of training images 412 on which to apply learning techniques and constraint comparisons; an exaggerated features and relationships buffer 414 to store pending and proposed exaggeration information; an exaggeration constraint engine 416 to maintain exaggeration within a range of probable faces; an exaggerated facial image mapper 418 to find the best-fit facial image to accommodate the generated exaggerated features and relationships; and a variable warping engine 420 to exaggerate (warp, morph, etc.) an unexaggerated drawing 308 into a caricature. These components and engines are communicatively coupled with a user interface (UI) 422 and control logic 424 as illustrated. It should be noted that an exemplary CE 304 can be implemented in hardware, software, or a combination of hardware and software.

Exemplary Drawing Engine 402

In this implementation of an exemplary CE 304, a drawing engine 402 produces or allows a user to produce a drawing, e.g., a line drawing, of a received facial image. The drawing engine 402 may include a line drawing utility and/or may include an automated "image to sketch" system. In one implementation, a user can easily create a line drawing of an input facial image without adding exaggeration, such as by tracing with a transparent layer over an original input facial image in versions of ADOBE PHOTOSHOP.

The facial features and relationships locator 404 then registers, inventories, surveys, graphs, etc. the drawing, recognizing facial features and boundaries, and quantitatively plots ("locates") a mathematical model describing the facial features, relationships, expressions, boundaries, etc., in the drawing. In one implementation, the mathematical model is located on the drawing by an active appearance model (AAM), as described in T. F. Cootes, G. J. Edwards, and C. J. Taylor, "Active appearance model," *Proceedings of the 5th European Conference on Computer Vision*, 1998.

Figure 5:
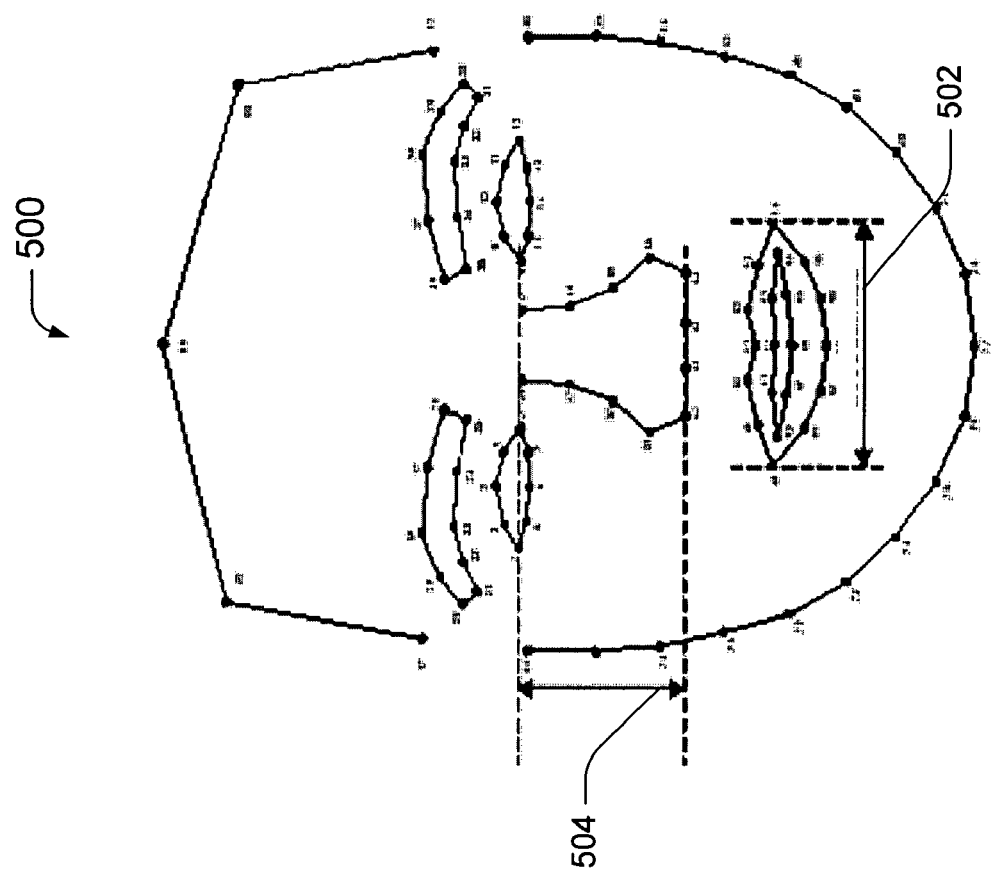
FIG. 5 is a graphic representation of an exemplary technique for modeling unexaggerated facial features and relationships between and among facial features.

FIG. 5 shows an exemplary mathematical model 500 generated by a facial features and relationships locator 404. Facial shape, features, and expressions are located on a drawing using point positions. Since the subject matter exaggerates relationships between and/or among facial features using the second principle of relativity, distances between points in the model are used in addition to the points themselves. A given group of points in the model may semantically describe a facial feature or relationship. Thus, the facial features and relationships locator 404 determines a set of semantic facial features and relationships from a number of key points on or assigned to a drawing, for example, horizontal distances between sets of key points that collectively describe the geometries of the face and its various features, relationships, and expressions. A mathematical model of the drawing is referred to herein as an "unexaggerated facial image." To incorporate the first and second principles of relativity, each feature and relationship is normalized, for example, by its mean and/or by the mean values of other features and relationships. This imputes semantic meaning to each feature and relationship.

In one implementation of the facial features and relationships locator 404, a mathematical model of an unexaggerated facial image is defined with 92 key points, shown in FIG. 5. Given a drawing, these key facial features and relationships points can be located by an AAM model with little or no human interaction. The semantic facial features and relationships are then calculated from the points. Facial features and relationships can be defined as distances between some pairs of points in the 92-point model. To be more robust, this implementation uses two kinds of features and relationships: horizontal (e.g., 502) and vertical (e.g., 504).

As shown in FIG. 5, the horizontal features (502) are calculated by the distance between two points along the X-axis, while the vertical features (504) are calculated by the distance along the Y-axis, exampled respectively by the width of the mouth and the length of the nose in FIG. 5. In this implementation, the 92 points are packed into a vector shown in Equation (1):

$$s = (x_1, y_1, x_2, y_2, \ldots, x_{92}, y_{92}) \quad \text{Equation (1)}$$

which is called a facial image definition vector "s." A feature or relationship vector "f" is an "s" vector with all zero elements except one "1" and one "−1." For example, if a horizontal feature is the difference of the "x" coordinates of point 1 and point 2, that is, $a = x_1 - x_2$, then the "feature and/or relationship" ("F&R") vector f for this horizontal feature or relationship can be written as shown in Equation (2):

$$f = (1, 0, -1, 0, \ldots, 0). \quad \text{Equation (2)}$$

The inner product of s and f is the value of the feature or relationship for the facial image: $sf = x_1 - x_2 = a$. For each feature and/or relationship, there is a corresponding F&R vector, each being a column vector. Putting all "n" features and relationships together creates a feature matrix "F" as shown in Equation (3):

$$F = (f_1^T, f_2^T, \ldots, f_n^T). \quad \text{Equation (3)}$$

The features of a given facial image can be computed as shown in Equation (4):

$$f_s = sF \quad \text{Equation (4)}$$

where $f_s$ is a (1 by n) vector wherein each element of the vector is the value of a feature. One important property of a feature matrix F is that if each feature and relationship is unique—i.e., not redundant—then F has a pseudo-inverse. This property is important for the exaggerated facial image mapper 418 which finds an exaggerated facial image to best fit a given F&R vector $f_s$, that is, a collection of exaggerated features and relationships generated by the exaggeration engine 406.

In one implementation, 47 features and relationships are represented in a feature and relationship set, hence, $f_s$ has 47 elements. To add new features and relationships to a feature and relationship set, a column is simply added to the feature matrix F.

Exemplary Exaggeration Engine 406

Figure 6:
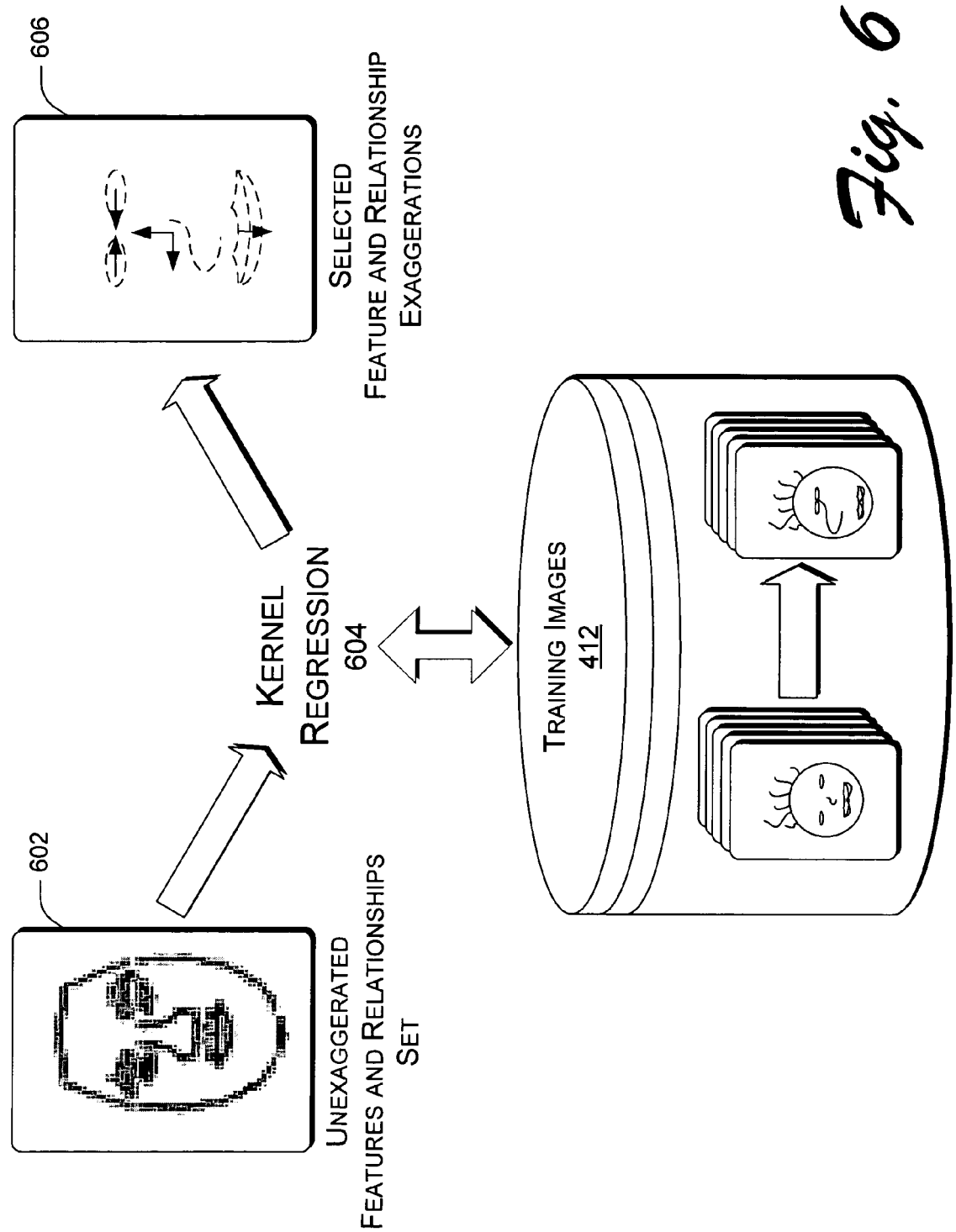
FIG. 6 is a graphic representation of an overview of an exemplary operation of an exaggeration engine.

FIG. 6 shows an overview of an exemplary operation of an exaggeration engine 406. An unexaggerated features and relationships set 602, e.g., the model described above and illustrated in FIG. 5, is presented as input to a kernel regression technique 604. The kernel regression technique 604 may be performed ahead of time. The kernel regression technique 604 learns from a database of weighted training images 412 which features and relationships in the unexaggerated features and relationships set 602 to exaggerate, and by how much. The kernel regression technique 604 outputs selected feature and relationship exaggerations 606.

Returning to FIG. 4, the exaggeration engine 406 receives the set of points and distances, i.e., the model of the unexaggerated facial image, describing a set of semantic facial features and/or relationships and automatically exaggerates at least some of the facial features and/or relationships using a comparison with corresponding facial features and relationships in a database of training images 412. In one implementation, the database of training images 412 may consist of pairs of images (facial drawings and their corresponding caricatures) produced by a single artist. This ensures that finished caricatures have features and relationships that emulate the training images 412 of the single artist. If the single artist is a master caricaturist, then caricatures produced by an exaggeration engine 406 are likely to embody a quality similar to the master's. In another or the same implementation, the database of training images 412 may consist of pairs of images produced by multiple artists. This allows a user to select a caricature style. In one implementation, a user can switch between training image collections, wherein each collection is unique to a single artist. In another implementation, a single training image collection includes image pairs by different artists, so that the benefit of artists who specialize in caricature of a particular facial feature or relationship, e.g., the ears, can be combined into one database of training images 412.

As mentioned above, a pair of images can consist of an unexaggerated drawing and an (exaggerated) caricature of the drawing done by the artist. Each pair of images in a database of training images 412 includes a great deal of information about how to exaggerate a drawing to achieve a caricature. Accordingly, a real, virtual, or derived map of the differences or "deltas" between an unexaggerated member of the image pair and an exaggerated member of an image pair can be used by the exaggeration engine to perform many aspects of caricature exaggeration.

In one implementation, a database of training images 412 has 210 pairs of drawings and corresponding caricatures. An AAM, as mentioned above, can be used to locate relevant facial images in the training images 412. Of note, if 92 "x, y" points are used to model a facial image, each facial image can be described by 184 integers. Thus, only (184)×(2)×(210)×(size of integers)=309120 bytes of memory are needed in this implementation to store the 210 pairs of images in the database of training images 412.

In one implementation, an exaggeration engine 406 includes a features and relationships selector 408 that further includes a learning engine 410. The features and relationships selector 408 learns which features and relationships are to be exaggerated and how much exaggeration is to be applied, for example, using a kernel-regression (KR) technique. The KR technique learns how to exaggerate aspects of a given unexaggerated facial image given training image pairs that may include similar unexaggerated facial images.

In the database of training images 412 and correspondingly in a drawing and its associated caricature produced by an exemplary CE 304, there exists a nonlinear mapping between unexaggerated features and relationships on one hand and corresponding exaggerated features and relationships on the other. This complex nonlinear mapping can be learned through kernel regression by weighting the training images 412 before performing a linear regression. Each facial image in the database of training images 412 has a relative importance for exaggerating and/or warping a particular facial feature or relationship between or among facial features. For example, if the features and relationships selector 408 determines that the nose should be exaggerated, then facial images with more relevance to nose changes will be assigned a higher weight value whereas others that have no relevance to nose exaggeration are assigned a lower weight. Thus, the collection of training images 412 with weightings is used to generate the exaggerations to be performed on the drawing. Using multiple images in this way provides more generality and adds variety to each caricature.

For each exaggerated feature or relationship, the generated magnitude of exaggeration can also be further adjusted by a user via control of the variable warping engine 420 through the exemplary UI 422. It should be noted that the KR technique performed by the learning engine 410 can be pre-performed, i.e., accomplished prior to both receiving a facial image and automatically generating a caricature.

An exemplary learning engine 410 can find which distinctive features and relationships a human artist would observe in order to draw a caricature from an unexaggerated drawing. The learning engine 410 uses the database of training images 412, which can be represented as pairs of unexaggerated and exaggerated F&R vectors. From the training images 412, the learning engine 410 finds a function "g" that maps an unexaggerated F&R vector $f_i$ to an exaggerated F&R vector $f_o$ in the feature space as described in Equation (5):

$$f_o = g(f_i, \text{training data}). \quad \text{Equation (5)}$$

If there are n features and or relationships $f_o = (f_{o1}, f_{o2}, \ldots, f_{on})$, then the mapping function g( ) can be separated into g( )=($g_1$( ), $g_2$( ), ..., $g_n$( )) where each $g_j$( ) is a mapping function from $f_i$ to the j-th element of $f_o$: $f_{oj}$=$g_j$($f_i$, training data).

The learning engine 410 uses KR to learn each $g_j$( ). KR is a modified version of linear regression that can solve non-linear learning problems. In KR, a kernel function, typically a radially based function is used to re-weight the training data as described in N. Arad, N. Dyn, D. Reisfeld, and Y. Yeshurun, "Image warping by radial basis functions: Applications to facial expressions," *Computer Vision, Graphics, and Image Processing*, 56(2):161-172, March 1994.

In one implementation, when the learning engine 410 processes an unexaggerated F&R vector $f_i$, the kernel function assigns more weight to those training image points which are closer to $f_i$ in a feature space (described below) and assigns less weight to those far away from $f_i$. Then conventional linear regression may be applied to the re-weighted training images 412.

Suppose that the mapping function $g_j$( ) has m pairs of training images 412 and that $X_j = (f_{t1}^T, f_{t2}^T, \ldots, f_{tm}^T)^T$ and $Y_j = (Y_{j1}, Y_{j2}, \ldots, Y_{jm})^T$. Each row of $X_j$ (m by n) is an unexaggerated F&R vector, and each element of $Y_j$ (m by 1) is the j-th element of the exaggerated F&R vector in the training data. Let W be a re-weighting matrix calculated by the kernel function. It is a (m by m) diagonal matrix with $W_{ii}$ being the weight for i-th training images point. Using KR the learning engine 410 finds a matrix $A_j$ (n by 1) so that $WX_j A_j = WY_j$. A maximum likelihood solution of $A_j$ is given by Equation (6):

$$A_j = (X_j^T W^T W X_j)^{-1}(X_j^T W^T W Y_j) \quad \text{Equation (6)}$$

Therefore, given an input F&R vector $f_i$, its corresponding output F&R vector $f_{oj}$ can be computed as shown in Equation (7):

$$g_j(\,):f_{oj}=f_i A_j. \quad \text{Equation (7)}$$

In one implementation, an exemplary exaggeration engine 406 may use an augmented features and relationships space to perform exaggeration of facial relationships—according to the aforementioned second principle of relativity. Each function $g_j$( ) has training image points represented by $X_j$ and $Y_j$. Each row of $X_j$ is an unexaggerated F&R vector in the training images 412, represented by $f_t = (f_{t1}, f_{t2}, \ldots, f_{tm})$. To encode the first type of relativity, which describes the facial feature in relation to its mean value, the j-th element of ft is replaced with the value of ($f_{tj}$/mean($f_{tj}$)), or the relative size of the j-th feature to its mean value. To encode the second type of relativity, which describes a relationship between or among a feature and other features, we replace the k-th (k does not equal j) elements of $f_t$ with the value of (($f_{tk}$/$f_{tj}$)/(mean($f_{tk}$)/($f_{tj}$)), where ($f_{tk}$/$f_{tj}$) is the relative size of k-th feature to j-th feature. After $f_t=(f_{t1}, f_{t2}, \ldots, f_{tm})$ is transformed as shown in Equation (8):

$$f_t'=((f_{t1}/f_{tj})/\text{mean}(f_{t1}/f_{tj})), \text{(continued next line)} ((f_{t2}/f_{tj})/\text{mean}(f_{t2}/f_{tj})), \ldots, f_{tj}/\text{mean}(f_{tj}) \quad \text{Equation (8)}$$

all values in the training images 412 for function $g_j()$ are in relative size.

In another implementation, exaggeration of facial relationships is not explicitly calculated according to the two types of relativity as described immediately above and the above calculations are not explicitly needed. Instead, an implicit technique aligns the training images and sets each mapping function go not only to individual elements of an input F&R vector, but to an entire F&R vector, as in Equation 7 above.

The features and relationships in the feature and relationships set may not be independent of one another. For example, the size of a person's left eye correlates strongly to the size of the right eye. This non-independence may make KR unstable for learning an $A_j$. To avoid instability, an exaggeration engine 406 may use a Principle Component Regression as described in J. F. MacGregor, T. Kourti, and J. V. Kresta, "Multivariate identification: A study of several methods," *Proceedings of IFAC ADCHEM*, 1991, instead of standard regression. In Principle Component Regression, the exaggeration engine 406 obtains a set of independent basis vectors for the features and relationships space and runs the regression on these new basis vectors.

In one implementation, an exemplary learning engine 410 uses a kernel function with of the form shown in Equation (9):

$$w_i = e(1/\|x-x_i+a\|^b) \quad \text{Equation (9)}$$

where x is the input and $x_i$ is the i-th training data point in the database of training images 412. The constants a and b may be determined by cross-validation. The distance function $\|x-x_i\|$ describes the distance between two data points x and $x_i$ in the newly transformed feature space described above. The definition of this distance function is important to kernel regression because it determines weights for all the training data. Training data points with larger distances to the input x will get lower weights, and vice versa. Mahalanobis distances (i.e., distances of individual points from a multivariate mean) are commonly used in high dimensional space as distance metrics. This may have the drawback that although an output feature or relationship may be related to only a few input features or relationships, the unrelated features or relationships contribute significantly to the Mahalanobis distance. Thus, a training data point which would be similar to the input feature or relationship and should receive a high weight if only related features and relationships are counted, may be assigned a lower weight. To alleviate this problem, a learning engine 410 may calculate the correlations of the output feature or relationship to all input features and relationships in the new feature space, and use this correlation to re-weight each input feature or relationship in order to calculate the Mahalanobis distance.

In one implementation, the exaggeration engine 406 exaggerates features and relationships selected by the features and relationships selector 408 by finding the difference between each exaggerated feature (or relationship) and a corresponding unexaggerated feature (or relationship), multiplying this difference by k, and then adding the product back onto the unexaggerated feature or relationship.

An exaggerated features and relationships buffer 414 may store the outputted exaggerated features and/or relationships from the exaggeration engine 406, to be used by the exemplary exaggeration constraint engine 416.

Exemplary Exaggeration Constraint Engine 416

Figure 7:
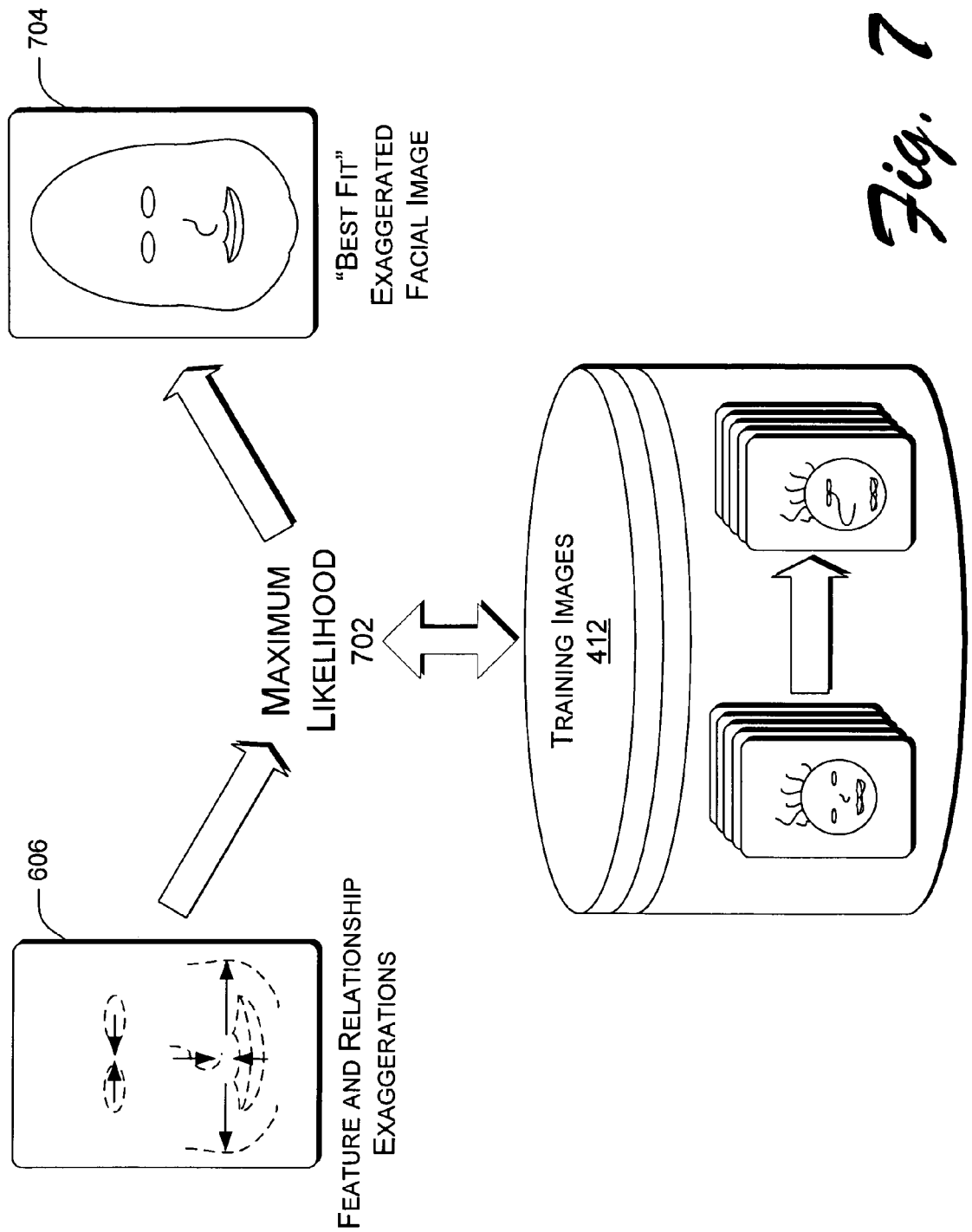
FIG. 7 is a graphic representation of an overview of an exemplary operation of an exaggeration constraint engine.

FIG. 7 shows an overview of an exemplary operation of an exaggeration constraint engine 416, which maintains exaggeration within a range of probable faces. The constraining imparted by the exaggeration constraint engine 416 is based on a likelihood that an act of exaggerating to be performed in creating a caricature will conform to allowable exaggerations in the caricatures in the database of training images 412. For example, a probable face would not have the eyes below the mouth, the mouth extending sideways past the cheeks, the eyes popping out of the head, etc.

The feature and relationship exaggerations 606 provided by the exaggeration engine 406 are passed as input to a maximum likelihood technique 702, which uses the database of training images 412 to find a "best fit" exaggerated facial image 704. The best fit exaggerated facial image 704 is selected (and/or generated) because it best accommodates the feature and relationship exaggerations 606. Since the best fit exaggerated facial image 704 is itself a rational and integrated facial image, it provides a constraint model against which degrees of applied exaggeration, warping, morphing, etc., will be kept within the bounds of what constitutes a believable, recognizable, and/or artistically respectable facial image.

Returning to FIG. 4, the exaggeration constraint engine 416 uses exaggerated caricatures in the database of training images 412 to find a most likely exaggerated facial image that best fits the exaggerated features and relationships in the exaggerated features and relationships buffer 414, or otherwise provided by the exaggeration engine 406. An exaggerated facial image should be recognizable as a human face. For instance, eyes should be placed superior to the mouth, the mouth should not be wider than the face, etc. In one implementation, an exaggeration constraint engine 416 constructs a low-dimensional facial image subspace of training caricatures from the database of training images 412 onto which a new exaggerated facial image-in-the-making should project.

Given a facial image S, facial features and relationships can be computed by multiplying by the feature matrix F: $f_s=SF$. For a given F&R vector f, the exaggeration constraint engine 416 defines $\|SF-f\|$ as the distance between the facial image's (S) features and relationships and the F&R vector f.

To construct an implementation of the above-mentioned facial image subspace, the exaggeration constraint engine 416 may use principle component analysis (PCA) to find a set of basis vectors that span the exaggerated facial image subspace. Then any exaggerated facial image S can be written as the linear combination of these basis vectors:

$$S=XB+\mu \quad \text{Equation (10)}$$

$$B=[b_1, b_2, \ldots, b_k]^T \quad \text{Equation (11)}$$

$$X=[x_1, x_2, \ldots, x_k] \quad \text{Equation (12)}$$

where the $b_i$'s are the first k Eigenvectors (92 by 1) from PCA and $x_i$ is the corresponding coefficients for S. X is the projection of S in the space spanned by the k Eigenvectors. The "$\mu$" is the mean exaggerated facial image.

In one implementation, the exaggeration constraint engine 416 makes an assumption that a distribution of exaggerated facial images is Gaussian. When an exaggerated facial image is projected to the above subspace, the distribution is still gaussian. So the probability of any given facial image S with a projection X in the subspace becomes:

$$p(S)=p(X)=(1/D)\exp(-X\Lambda^{-1}X^T) \quad \text{Equation (13)}$$

where D is a normalization constant, and Λ the covariance matrix where the diagonal matrix is:

$$\Lambda = \text{diag}(\sigma_1, \sigma_2, \ldots, \sigma_k).$$  Equation (14)

In one implementation, an exaggerated facial image mapper 418 uses a maximum likelihood technique to find the best fit facial image to accommodate the generated exaggerated features and relationships.

Given a feature or relationship f, the likelihood of a facial image S can be defied as:

$$p(S|f) = p(f|S)p(S)$$  Equation (15)

and $$p(S|f) = (1/D')\exp(-\|SF-f\|^2/\lambda)p(S)$$  Equation (16)

where $\|SF-f\|$ is the distance between the feature or relationship of the facial image S and the given F&R vector f. F is the feature and relationship matrix. The "λ" and D' are constants. The p(S) can be replaced by Equation (13).

Given an exaggerated F&R vector f, the exaggerated facial image mapper 418 finds a facial image S from the exaggerated facial image subspace to maximize the likelihood in Equations (15) and (16). The exaggerated facial image mapper 418 replaces S in Equations (15) and (16) with (XB+μ):

$$p(S|f) = (1/D')\exp(-\|(XB+\mu)F-f\|^2/\lambda)p(S).$$  Equation (17)

Then Equation (13) is inserted into Equation (17):

$$p(S|f) = (1/D'D)\exp((-\|(XB+\mu)F-f\|^2 - \lambda X\Lambda^{-1}X^T)/\lambda).$$  Equation (18)

The X that maximizes the likelihood is:

$$X_{max} = \arg\min(\|(XB+\mu)F-f\|^2 + \lambda X\Lambda^{-1}X^T)$$  Equation (19)

yielding:

$$X_{max} = (f-\mu F)F^T B^T (BFF^T B^T + \lambda\Lambda^{-1})^{-1}$$  Equation (20)

As previously mentioned, the features and relationships matrix F has a pseudo-inverse. Because the basis vector B includes only basis vectors of the subspace, B also has a pseudo-inverse. Since "Λ" is a diagonal matrix with all positive diagonal elements (the elements are the variance of the database) Λ too has a pseudo-inverse. Therefore, the exaggerated facial image mapper 418 can reliably compute $X_{max}$ in Equation (20).

In Equation (19), the exaggerated facial image mapper 418 finds an X that minimizes a weighted sum of the two terms in Equation (19). The first term $\|(XB+\mu)F-f\|^2$ is the distance between the facial F&R vector of facial image S and the given F&R vector f. The second term $\lambda X\Lambda^{-1}X^T$ is the distance from S to the mean face shape μ in the exaggerated facial image subspace weighted by a constant λ. An optimal X not only minimizes the distances (differences) between corresponding features and between corresponding relationships, but also tries to adhere to the mean facial image. This second term provides some assurance that even if the given facial F&R vector is not reasonable the exaggerated facial image will not stray far from the mean facial image. Without this second term, an output exaggerated facial image may not look like a human face at all.

Exemplary Variable Warping Engine 420

Figure 8:
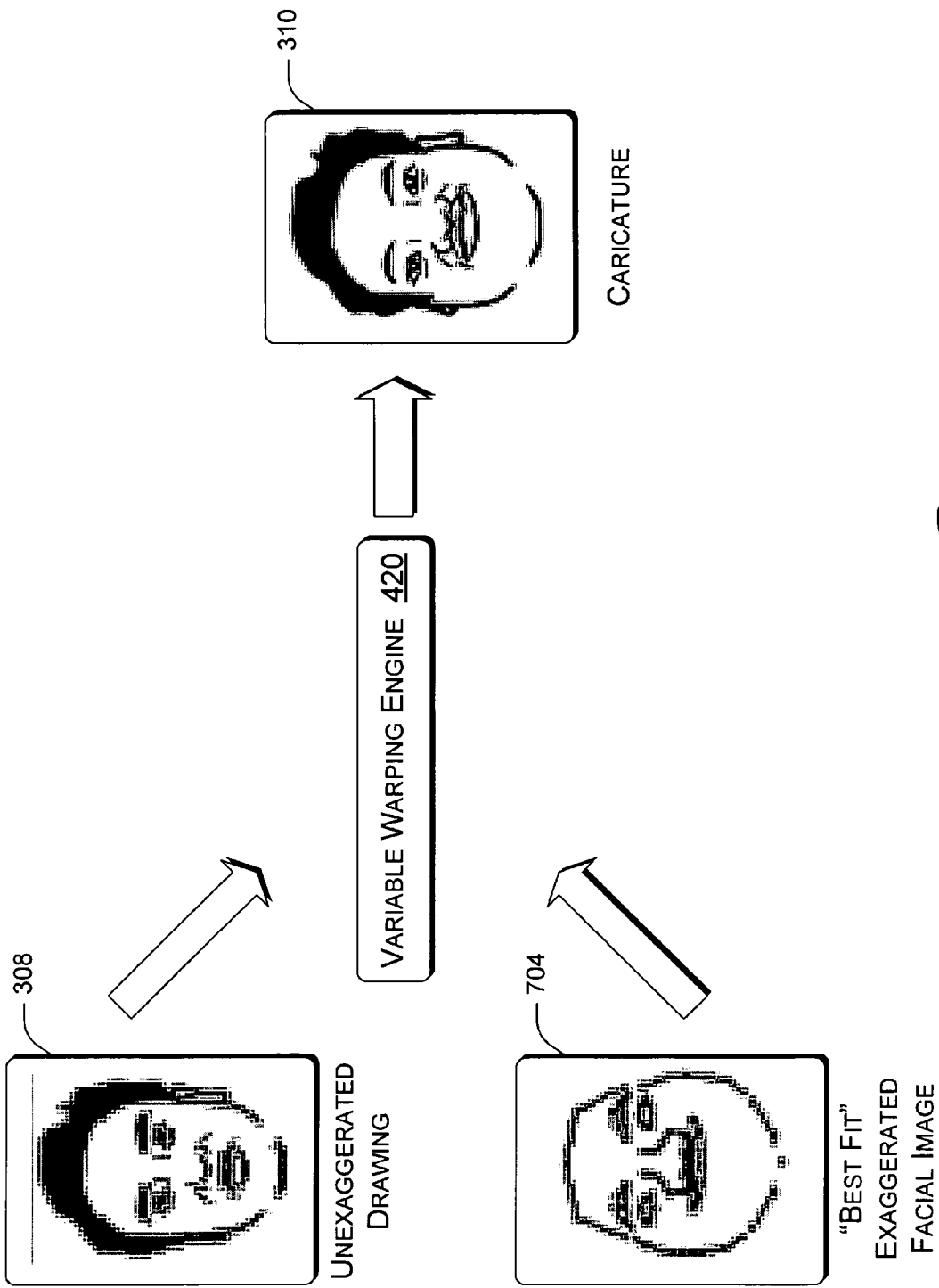
FIG. 8 is a graphic representation of an exemplary operation of a variable warping engine.

FIG. 8 shows an exemplary operation of a variable warping engine 420. A variable warping engine 420 uses a best fit exaggerated facial image 704 to warp, morph, exaggerate, etc., an unexaggerated drawing 308 into a caricature 310, while constraining the degree of exaggeration for particular features and relationships, if necessary, to maintain human facial integrity. That is, after obtaining an exaggerated facial image 704, the exaggerated facial image is variably combined with unexaggerated lines from the associated unexaggerated drawing 308 to produce a completed caricature 310.

Exemplary User Interfaces

Figure 9:
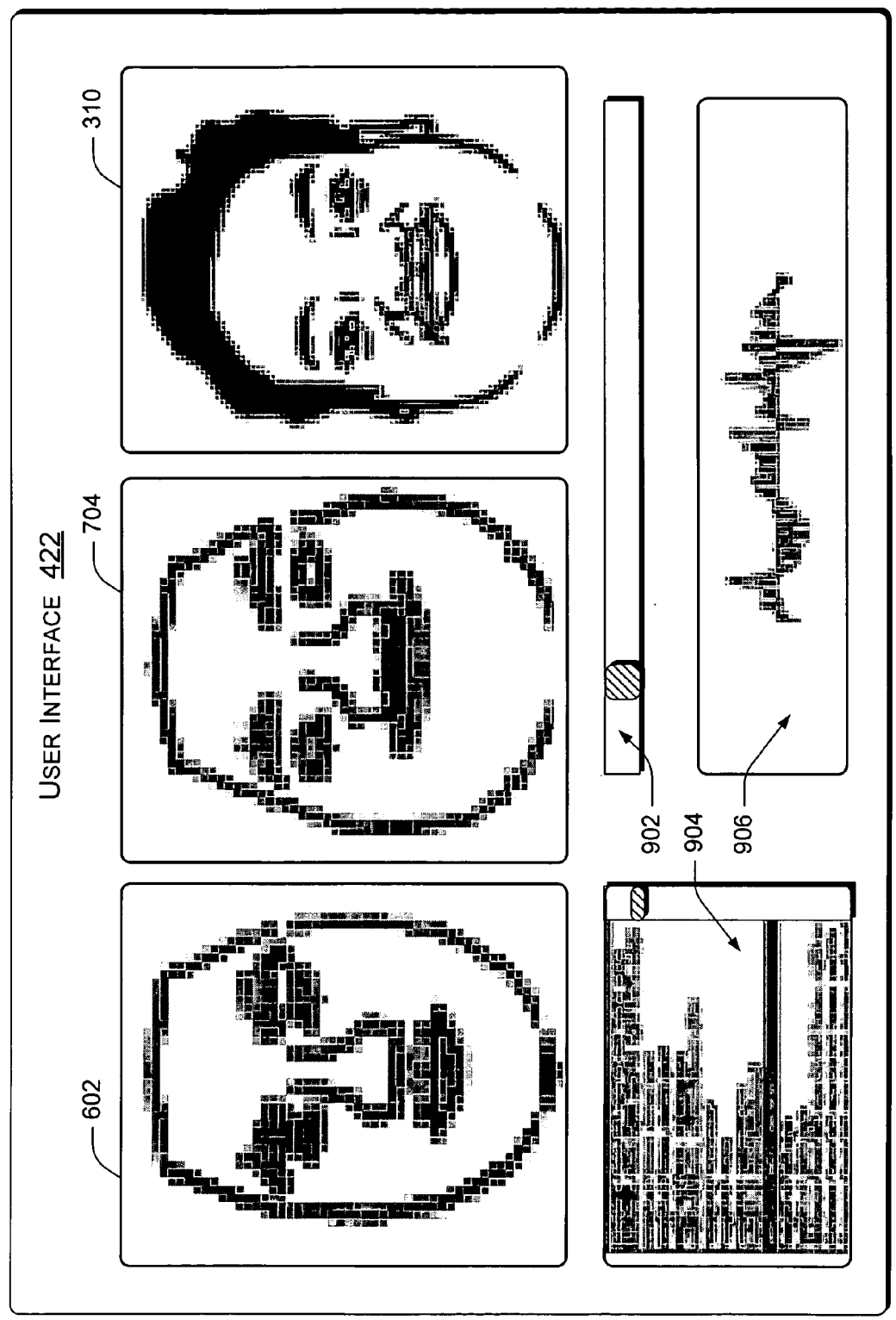
FIG. 9 is a graphic representation of an exemplary user interface.

FIG. 9 shows an exemplary user interface (UI) 422. The UI 422 favors inexperienced users with no training in caricature creation. Since an exemplary caricature system 300 or an exemplary CE 304 can variably warp drawings and generate caricatures in real-time, an exemplary UI 422 simultaneously shows visualizations of the caricature exaggeration processes at strategic points, including a portrayal of unexaggerated features and relationships 602, an exaggerated facial image generated by the CE 304, and a completed caricature 310. The UI 422 can include many buttons, menus, and other controllers for creating caricatures that have variable degrees of exaggeration. For example, when a user clicks a "morph" button (not shown in FIG. 9), an exemplary CE 304 generates a caricature 310 in real-time by morphing an unexaggerated drawing 308 according to an associated best fit exaggerated facial image 704. A scroll bar 902 or other slider may provide a user with real-time control over a continuous degree-of-exaggeration spectrum for facial features and relationships. Thus, multiple visualization windows and variability controllers are provided in the UI 422 so that a user can easily see the effect of real-time variable warping on the various features and relationships of an input image.

A user may also adjust the size of any single feature or relationship before and/or after the exaggeration. Accordingly, a semantic features and relationships list 904 is provided, from which a user can select a feature or relationship to alter or variably exaggerate. Graphs 906, such as bar graphs, histograms, and other visual meters can display a visualization of selected feature and relationship magnitudes.

In one implementation, an exemplary UI 422 allows a user to further modify a caricature 310 by clicking on a displayed feature or relationship and dragging the feature or relationship with a mouse or other control device to change the size or shape of the feature or relationship, to increase the degree of exaggeration, e.g., widen a nose, etc.

Exemplary Methods

Figure 10:
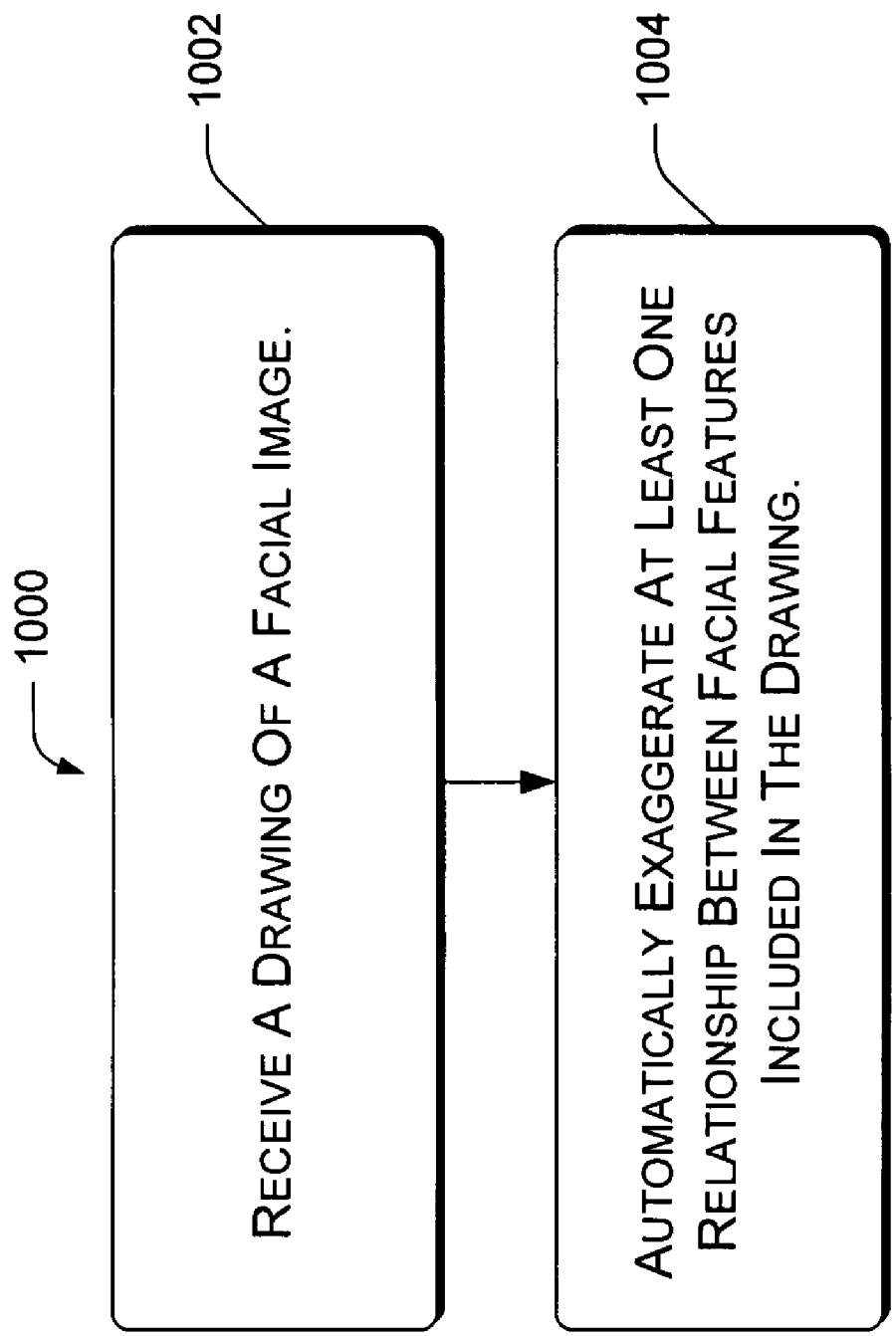
FIG. 10 is a flowchart of an exemplary method of caricature exaggeration.

FIG. 10 shows an exemplary method 1000 of performing caricature exaggeration. In the flow diagram, operations are summarized in individual blocks. The operations may be performed in hardware and/or as machine-readable instructions (software or firmware) that can be executed by a processor or engine, such as an exemplary CE 304.

At block 1002, a drawing of a facial image is received. The drawing may have been manually created by a user tracing a digital photo, or may have been automatically generated by a drawing engine of an exemplary CE 304. Ideally, the drawing includes discrete lines and/or points that clearly demarcate the major features of a person's face so that these major features, subtle minor features, and relationships between and/or among facial features can be recognized and modeled, e.g., by a facial features and relationships locator 404.

At block 1004, at least one relationship between facial features included in the drawing is automatically exaggerated. This automatic exaggeration, for example, as performed by an exemplary exaggeration engine 406 that includes a learning engine 410 running a kernel regression technique, takes place while the constraints of human facial integrity are automatically maintained. The constraints of human facial integrity may be automatically maintained by an exemplary exaggeration constraint engine 416 running a maximum likelihood technique.

Figure 11:
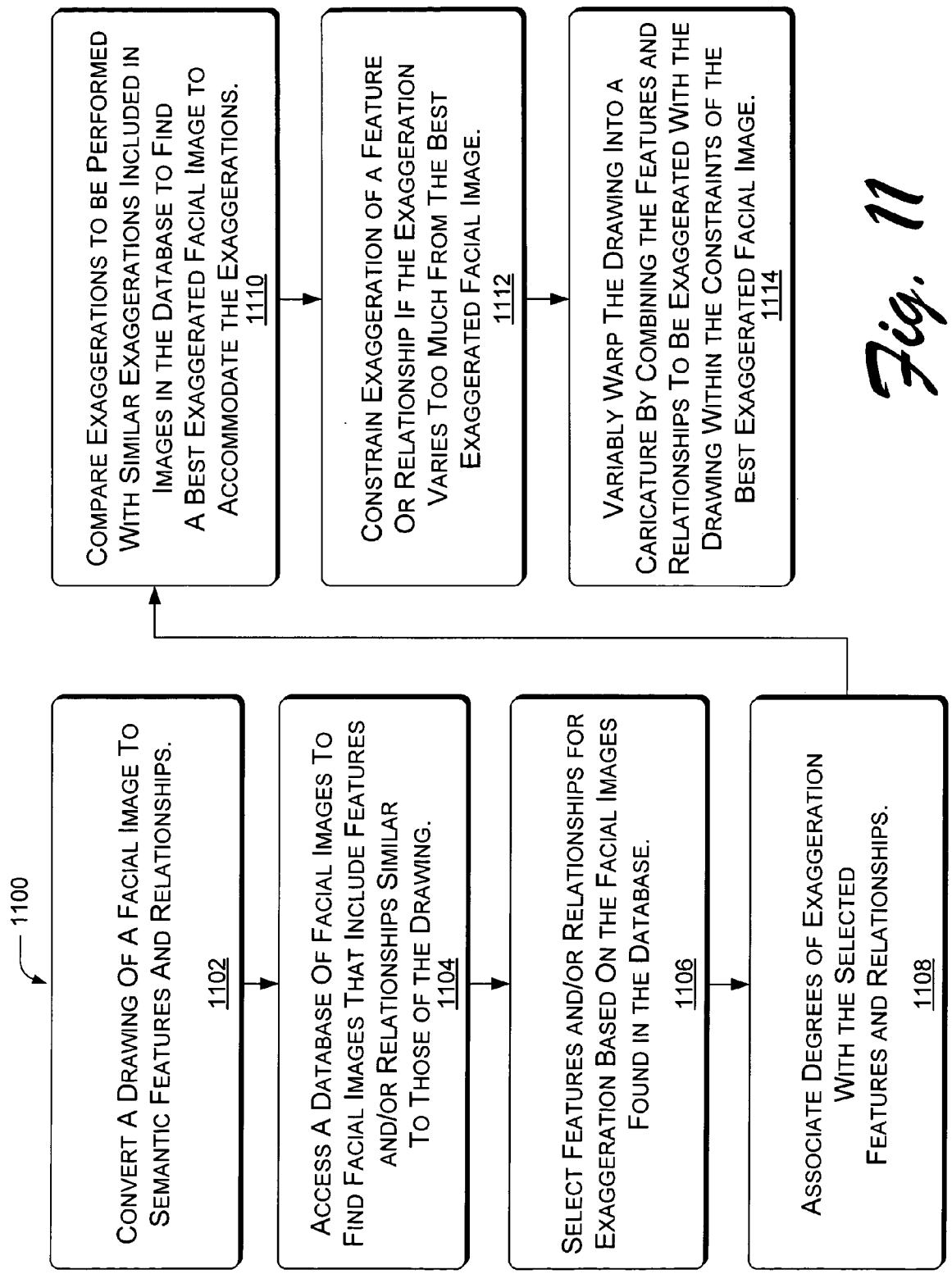
FIG. 11 is a flowchart of another exemplary method of caricature exaggeration.

FIG. 11 shows another exemplary method 1100 of performing caricature exaggeration. In the flow diagram, operations are summarized in individual blocks. The operations may be performed in hardware and/or as machine-readable instructions (software or firmware) that can be executed by a processor or engine, such as an exemplary CE 304.

At block 1102, a drawing of a facial image is converted to semantic features and relationships. The conversion may be accomplished by a facial features and relationships locator 404 of an exemplary CE 304.

At block 1104, a database of facial images is accessed to find facial images that include features and/or relationships similar to those of the drawing, for example, by an exaggeration engine 406 deploying a kernel regression technique.

At block 1106, features and/or relationships are selected for exaggeration based on the facial images found in the database. The kernel regression technique may assign weights to various training images so that training images that are more relevant to a particular facial feature or relationship carry a higher weight when accessed in the context of the particular facial feature or relationship.

At block 1108, degrees of exaggeration are associated with the features and relationships selected in block 1106. The kernel regression technique also learns how much exaggeration to apply to a given feature or relationship in addition to selecting those features and relationships to be exaggerated in the caricature.

At block 1110, exaggerations to be performed on the selected features and relationships are compared with similar exaggerations included in images in the database to find a best exaggerated facial image to accommodate the features and relationships to be exaggerated. An exemplary exaggeration constraint engine 416 consults a database of training images 412 to try to find an overall best exaggerated facial image derived from the training images 412 to use as an example or model for warping the original drawing into the caricature. In other words, a best exaggerated facial image gleaned or generated from the database of training images may serve as a unifying but also moderating template, so that when variable warping is applied to create various degrees of caricature, exaggerations that stray too far from the moderating template can be attenuated.

At block 1112, exaggeration of a feature or relationship is constrained if the exaggeration varies too much from the best fit exaggerated facial image. An exaggeration constraint engine 416 deploys a maximum likelihood technique in selecting or generating the best fit exaggerated facial image to accommodate the features and relationships to be exaggerated. This leaves a wide latitude for performing extreme degrees of exaggeration without the flux of variable exaggeration substantially affecting the constraints afforded by the best fit exaggerated facial image.

At block 1114, the drawing is variably warped into a caricature by combining the features and relationships to be exaggerated with the drawing within the constraints of the best exaggerated facial image. A variable warping engine 420 can control many aspects of variable exaggeration of single or collective facial features and relationships. An exemplary UI 422, in turn, provides a user control over many aspects of the performance of the variable warping engine 420.

Exemplary Computing Device

FIG. 12 shows an exemplary computing device 302 suitable as an environment for practicing aspects of the subject matter, for example to host an exemplary CE 304. The components of computing device 302 may include, but are not limited to, a processing unit 1220, a system memory 1230, and a system bus 1221 that couples various system components including the system memory 1230 to the processing unit 1220. The system bus 1221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISAA) bus, Video Electronics Standards Association (VESA) local bus, and Peripheral Component Interconnect (PCI) bus also known as the Mezzanine bus.

Exemplary computing device 302 typically includes a variety of computing device-readable media. Computing device-readable media can be any available media that can be accessed by computing device 302 and includes both volatile and nonvolatile media, removable and non-removable media. By way of example, and not limitation, computing device-readable media may comprise computing device storage media and communication media. Computing device storage media include volatile and nonvolatile, removable and non-removable media implemented in any method or technology for storage of information such as computing device-readable instructions, data structures, program modules, or other data. Computing device storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 302. Communication media typically embodies computing device-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 1230 includes computing device storage media in the form of volatile and/or nonvolatile memory such as read only memory (ROM) 1231 and random access memory (RAM) 1232. A basic input/output system 1233 (BIOS), containing the basic routines that help to transfer information between elements within computing device 302, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, application programs 1235, other program modules 1236, and program data 1237. Although the exemplary CE 304 is depicted as software in random access memory 1232, other implementations of an exemplary CE 304 can be hardware or combinations of software and hardware.

The exemplary computing device 302 may also include other removable/non-removable, volatile/nonvolatile computing device storage media. By way of example only, FIG. 12 illustrates a hard disk drive 1241 that reads from or writes to non-removable, nonvolatile magnetic media, a magnetic disk drive 1251 that reads from or writes to a removable, nonvolatile magnetic disk 1252, and an optical disk drive 1255 that reads from or writes to a removable, nonvolatile optical disk 1256 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 1241 is typically connected to the system bus 1221 through a non-removable memory interface such as interface 1240, and magnetic disk drive 1251 and optical disk drive 1255 are typically connected to the system bus 1221 by a removable memory interface such as interface 1250.

The drives and their associated computing device storage media discussed above and illustrated in FIG. 12 provide storage of computing device-readable instructions, data structures, program modules, and other data for computing device 302. In FIG. 12, for example, hard disk drive 1241 is illustrated as storing operating system 1244, application programs 1245, other program modules 1246, and program data 1247. Note that these components can either be the same as or different from operating system 1234, application programs 1235, other program modules 1236, and program data 1237. Operating system 1244, application programs 1245, other program modules 1246, and program data 1247 are given different numbers here to illustrate that, at a minimum, they are different copies. A user may enter commands and information into the exemplary computing device 302 through input devices such as a keyboard 1248 and pointing device 1261, commonly referred to as a mouse, trackball, or touch pad. Other input devices (not shown) may include a microphone, joystick, game pad, satellite dish, scanner, or the like. These and other input devices are often connected to the processing unit 1220 through a user input interface 1260 that is coupled to the system bus, but may be connected by other interface and bus structures, such as a parallel port, game port, or a universal serial bus (USB). A monitor 1262 or other type of display device is also connected to the system bus 1221 via an interface, such as a video interface 1290. In addition to the monitor 1262, computing devices may also include other peripheral output devices such as speakers 1297 and printer 1296, which may be connected through an output peripheral interface 1295.

The exemplary computing device 302 may operate in a networked environment using logical connections to one or more remote computing devices, such as a remote computing device 1280. The remote computing device 1280 may be a personal computing device, a server, a router, a network PC, a peer device or other common network node, and typically includes many or all of the elements described above relative to computing device 302, although only a memory storage device 1281 has been illustrated in FIG. 12. The logical connections depicted in FIG. 12 include a local area network (LAN) 1271 and a wide area network (WAN) 1273, but may also include other networks. Such networking environments are commonplace in offices, enterprise-wide computing device networks, intranets, and the Internet.

When used in a LAN networking environment, the exemplary computing device 302 is connected to the LAN 1271 through a network interface or adapter 1270. When used in a WAN networking environment, the exemplary computing device 302 typically includes a modem 1272 or other means for establishing communications over the WAN 1273, such as the Internet. The modem 1272, which may be internal or external, may be connected to the system bus 1221 via the user input interface 1260, or other appropriate mechanism. In a networked environment, program modules depicted relative to the exemplary computing device 302, or portions thereof, may be stored in the remote memory storage device. By way of example, and not limitation, FIG. 12 illustrates remote application programs 1285 as residing on memory device 1281. It will be appreciated that the network connections shown are exemplary and other means of establishing a communications link between the computing devices may be used.

CONCLUSION

It should be noted that the subject matter described above can be implemented in hardware, in software, or in both hardware and software. In certain implementations, the exemplary system, engine, and related methods may be described in the general context of computer-executable instructions, such as program modules, being executed by a television set-top box and/or by a computer. Generally, program modules include routines, programs, objects, components, data structures, etc. that perform particular tasks or implement particular abstract data types. The subject matter can also be practiced in distributed communications environments where tasks are performed over wireless communication by remote processing devices that are linked through a communications network. In a wireless network, program modules may be located in both local and remote communications device storage media including memory storage devices.

The foregoing discussion describes exemplary systems, engines, and methods for caricature exaggeration. Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method, comprising:
receiving a facial image;
creating a line-drawing from the facial image;
computing a set of semantic facial features from key points of a face in the facial image to describe a geometric shape of the face;
comparing relationships among the semantic facial features to corresponding relationships between unexaggerated and exaggerated features in reference facial images and associated reference caricatures drawn by an artist and stored in a reference database;
applying a kernel regression to select some of the semantic facial features in the facial image for caricature exaggeration and to exaggerate the semantic facial features into exaggerated features, wherein a nonlinear mapping between corresponding unexaggerated and exaggerated features in the reference database is learned via the kernel regression;
selecting a relationship among facial features of the facial image to exaggerate based on a variance of the relationship from a norm derived from the reference facial images in the reference database, wherein relationships having relatively high variance from the norm are selected for exaggeration, wherein the selecting a relationship comprises:
performing a kernel regression in order to map the relationship to similar relationships among similar facial features in the reference facial images;
assigning weights to the reference facial images based on a similarity of the relationship to corresponding relationships among facial features in the facial images, wherein a high weight is assigned to a high similarity; and
applying a linear regression to the weighted facial images generating from the facial image, an exaggerated face shape by applying a maximum likelihood estimation (MLE) to the exaggerated features of the facial image; and
morphing the line-drawing into the exaggerated face shape to create a facial caricature, wherein:
for each semantic facial feature to be exaggerated a degree of exaggeration is determined by the kernel regression; and
the degree of exaggeration of each feature to be exaggerated is adjustable by a user.

2. The method as recited in claim 1, wherein the kernel regression technique assigns various weights to the reference facial images and associated caricatures based on a similarity to one or more relationships among facial features in the line-drawing.

3. The method as recited in claim 1, wherein creating a line-drawing includes rendering the facial image into a set of points, wherein at least some of the points describe at least some of the facial features and wherein at least some distances between the points represent at least one relationship among facial features.

4. The method as recited in claim 1, further comprising constraining the exaggerating of a relationship among facial features to maintain the facial image within a range of probable faces.

5. The method as recited in claim 4, wherein the constraining is based on a likelihood that the exaggerating conforms to allowable exaggerations in the associated caricatures.

6. The method as recited in claim 4, wherein the constraining includes:
deriving a first map representing differences between the line-drawing of the facial image and the facial image after the exaggerating;
deriving a second map representing averaged differences between the reference facial images and their associated caricatures;
comparing the first map against the second map;
adjusting at least some of the differences in the first map to more closely approximate corresponding differences in the second map; and
adjusting an exaggerated relationship based on the adjusted first map.

7. The method as recited in claim 6, wherein the adjusting at least some of the differences in the first map to more closely approximate corresponding differences in the second map uses a maximum likelihood model.

8. The method as recited in claim 4, wherein the constraining includes:
deriving a map representing differences between the line drawing of the facial image and the facial image after the exaggerating;
selecting one of the reference caricatures based on a similarity to the map; and
conforming the exaggerating to the selected reference caricature, wherein if exaggeration of a relationship varies beyond a threshold from a corresponding relationship in the selected reference caricature, then a degree of the exaggerating of the facial image is altered to conform to the relationship in the selected reference caricature.

9. The method as recited in claim 8, wherein the selecting one of the reference caricatures uses a maximum likelihood technique.

10. The method as recited in claim 8, further comprising variably combining the line-drawing of the facial image with the selected reference caricature in order to produce a variably exaggerated caricature of the facial image.

11. The method as recited in claim 1, wherein the variance of the relationship from the norm is determined by:
measuring one or more distances representing the relationship among facial features of the facial image; and
comparing the one or more distances with corresponding average distances in the reference facial images.

12. The method as recited in claim 1, wherein the selecting a relationship includes:
selecting the relationship for exaggeration if the relationship varies by a threshold from an average for the similar relationships.

13. The method as recited in claim 1, wherein the selecting a relationship includes:
measuring one or more distances representing the relationship among facial features of the facial image; and
selecting the relationship for the exaggerating if one or more distances representing the relationship vary beyond a first threshold from one or more corresponding average distances among facial features derived from the reference facial images that are assigned a weight that exceeds a second threshold.

14. The method as recited in claim 1, further comprising varying a degree of the exaggerating to be applied to a relationship among facial features while constraining the exaggerating in order to maintain the facial image within a range of probable faces.

15. The method as recited in claim 1, further comprising exaggerating one of a shape and a size of a facial feature.

16. A system, comprising:
means for rendering a facial image into a drawing;
means for selecting a relationship among facial features of the facial image based on a variance from a norm, the means for selecting comprising:
a means for comparing relationships among facial features in the drawing to corresponding relationships in reference facial images and associated reference caricatures in a database of reference facial images and corresponding reference caricatures drawn by an artist, wherein the means for comparing is facilitated by a kernel regression technique that assigns various weights to the facial images and associated caricatures based on a similarity to one or more relationships among facial features in the drawing;
a means for applying a linear regression to the weighted facial images; and
means for exaggerating at least one relationship among facial features in the drawing based on the corresponding relationships in the reference facial images and associated reference caricatures,
wherein a degree of exaggeration for each facial feature to be exaggerated is user-adjustable.

17. The system as recited in claim 16, further comprising means for constraining the exaggerating to maintain the facial image of the drawing within a range of probable faces.

18. The system as recited in claim 17, further comprising:
means for deriving a map representing differences between the drawing of the facial image and the facial image after the exaggerating;
means for selecting one of the associated caricatures based on a similarity to the map; and
means for conforming the exaggerating to the caricature.

19. The system as recited in claim 18, wherein the means for selecting includes means for performing a maximum likelihood technique.

20. The system as recited in claim 18, further comprising means for variably combining the drawing of the facial image with the selected reference caricature in order to produce a variably exaggerated caricature of the facial image in the drawing.

21. The system as recited in claim 16, further comprising means for varying a degree of the exaggerating to be applied to a relationship among facial features while constraining the exaggerating in order to maintain the facial image within a range of probable faces.

22. A caricature engine embodied as instructions on a computing device storage media, comprising:
a facial features and relationships locator to receive a facial image and locate a set of facial features and relationships among facial features in the facial image;
an exaggeration engine to compare the facial features and relationships in the facial image to facial features and relationships in a reference collection of pairs of reference facial images and associated reference caricatures stored in a database in order to determine which of the facial features and relationships to exaggerate in the facial image based upon a variance of the relationship from a norm, wherein the exaggeration engine comprises:
a kernel regression technique that assigns various weights to the facial images and associated caricatures based on a similarity to one or more relationships among facial features in the drawing;
a linear regression of the weighted facial features; and
an exaggeration constraint engine to compare exaggerations applied to the facial image with at least one selected reference caricature from the associated reference caricatures in order to conform a degree of the exaggerations to the at least one selected reference caricature,
wherein a degree of exaggeration for each facial feature to be exaggerated is user-adjustable.

23. The caricature engine as recited in claim 22, further comprising a learning engine to compare the facial features and relationships in the facial image to facial features and relationships in the reference collection by applying a kernel regression technique.

24. The caricature engine as recited in claim 22, further comprising a variable warping engine to variably combine the facial image with the at least one selected reference caricature in order to produce a variably exaggerated caricature of the facial image, while maintaining the variably combined facial image and caricature within a range of probable faces.

25. A user interface displayed by a computing device, the user interface comprising:
a first display area to depict a facial image;
a second display area to depict variably exaggerated facial features and relationships among the facial features of the facial image;
a third display area to depict a caricature of the facial image; and
a variable exaggeration controller facilitated by the computing device to control a degree of variable exaggeration applied to one or more facial features and relationships in the facial image,
wherein the facial image, the variably exaggerated facial features, and the caricature are obtained by a process, facilitated by the computing device, that includes:
receiving a facial image;
creating a line-drawing from the facial image;
computing a set of semantic facial features from key points of a face in the facial image to describe a geometric shape of the face;
comparing relationships among the semantic facial features to corresponding relationships between unexaggerated and exaggerated features in reference facial images and associated reference caricatures in a reference database of caricatures drawn by an artist to determine which relationships vary most from a norm;
applying a kernel regression to select some of the semantic facial features for caricature exaggeration and to exaggerate the semantic facial features into exaggerated features, wherein a nonlinear mapping between corresponding unexaggerated and exaggerated features in the reference database is learned via the kernel regression;
assigning weights to the reference facial images based on a similarity of the relationship to corresponding relationships among facial features in the facial images, wherein a high weight is assigned to a high similarity;
applying a linear regression to the weighted facial images;
generating an exaggerated face shape by applying a maximum likelihood estimation (MLE) to the exaggerated features; and
morphing the line-drawing into the exaggerated face shape to create a facial caricature,
wherein:
for each semantic facial feature to be exaggerated the degree of exaggeration is determined by the kernel regression; and
the degree of exaggeration of each feature to be exaggerated is adjustable by a user.

26. The user interface as recited in claim 25, wherein the first, second, and third display areas are shown simultaneously.

27. The user interface as recited in claim 25, further comprising a selectable list of facial features and relationships to be selected for variable exaggeration.

28. The user interface as recited in claim 25, further comprising means for manually adjusting a size of a single feature or relationship.

29. The user interface as recited in claim 25, further comprising means for manually changing a shape of a facial feature in one of the display windows.

30. A computing device storage media containing instructions that are executable by a computing device to perform actions comprising:
rendering a facial image into a drawing;
comparing relationships among facial features in a facial image to corresponding relationships in a collection of reference facial images and associated reference caricatures determine which relationships vary most from a norm, the variance determined using a kernel regression technique, wherein the kernel regression technique assigns various weights to the reference facial images and associated reference caricatures in the collection based on a similarity to one or more relationships among facial features in the facial image then applying a linear regression to the weighted facial images;

exaggerating at least one relationship among facial features in the facial image based on the comparing, wherein the exaggerating includes applying a kernel regression technique and the degree of the exaggerating is user-adjustable.

31. The computing device storage media as recited in claim 30, the actions further comprising constraining the exaggerating to maintain the facial image within a range of probable faces.

32. The computing device storage media as recited in claim 30, the actions further comprising:

deriving a map representing differences between the facial image and the facial image after the exaggerating;

selecting a reference caricature from the collection based on a similarity to the map; and conforming the exaggerating to the reference caricature, wherein if exaggeration of a relationship varies beyond a threshold from a corresponding relationship in the reference caricature, then a degree of the exaggerating is altered to conform the relationship to the reference caricature.

33. The computing device storage media as recited in claim 32, wherein the selecting includes a maximum likelihood technique.

34. The computing device storage media as recited in claim 30, the actions further comprising combining the facial image with the caricature in order to produce a variably exaggerated caricature of the facial image.

35. The computing device storage media as recited in claim 30, the actions further comprising allowing a user to vary a degree of the exaggerating to be applied to a relationship among facial features while constraining the exaggerating in order to maintain the facial image within a range of probable faces.

36. An automated method, comprising:

collecting reference pairs of facial images, wherein each pair includes an unexaggerated facial image and a caricature of the unexaggerated facial image;

receiving a facial drawing to compare with the pairs of reference facial images;

iteratively comparing characteristics of the facial drawing with characteristics in the reference pairs; and selecting one of the reference pairs via a kernel regression technique as a model for variably exaggerating at least part of the facial drawing, wherein the degree of variable exaggeration via the kernel regression technique is user-adjustable, whereby selecting is based upon a variance of the characteristic from a norm derived from the reference facial images in the reference database, wherein a characteristic having relatively high variance from the norm is selected for exaggeration, wherein the selecting the characteristic comprises:

performing a kernel regression in order to map the characteristic to similar characteristics among similar facial images in the reference facial images;

assigning weights to the reference facial images based on a similarity of the characteristic to corresponding reference characteristic among the facial images, wherein a high weight is assigned to a high similarity; and applying a linear regression to the weighted facial images.

37. The automated method as recited in claim 36, wherein the characteristics include relationships among facial features in the facial drawing.

38. The automated method as recited in claim 36, wherein the iterative comparing uses a kernel regression technique.

39. The automated method as recited in claim 36, wherein the iterative comparing constrains the variable exaggeration of a relationship among facial features in the facial drawing to a degree of exaggeration of a corresponding relationship in the reference pair.

* * * * *